United States Patent
Garcia et al.

(10) Patent No.: US 10,260,316 B2
(45) Date of Patent: Apr. 16, 2019

(54) FACILITY FOR MONITORING GEOLOGICAL GAS STORAGE SITES

(71) Applicant: IFP Energies nouvelles, Rueil-Malmaison (FR)

(72) Inventors: Bruno Garcia, Rueil Malmaison (FR); Virgile Rouchon, Saint-Cloud (FR); Adrian Cerepi, Pessac (FR); Corinne Loisy, Talence (FR); Olivier Le Roux, Pessac (FR); Jean Rillard, Paris (FR); Claude Bertrand, Ambazac (FR); Olivier Willequet, La Madeleine (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 0 days.

(21) Appl. No.: 15/572,052

(22) PCT Filed: Apr. 26, 2016

(86) PCT No.: PCT/EP2016/059316
§ 371 (c)(1),
(2) Date: Nov. 6, 2017

(87) PCT Pub. No.: WO2016/177606
PCT Pub. Date: Nov. 10, 2016

(65) Prior Publication Data
US 2018/0128084 A1 May 10, 2018

(30) Foreign Application Priority Data

May 5, 2015 (FR) ...................................... 15 53999

(51) Int. Cl.
*E21B 41/00* (2006.01)
*E21B 47/10* (2012.01)

(52) U.S. Cl.
CPC .......... *E21B 41/0064* (2013.01); *E21B 47/10* (2013.01); *E21B 47/102* (2013.01); *E21B 47/1025* (2013.01); *Y02C 10/14* (2013.01)

(58) Field of Classification Search
CPC combination set(s) only.
See application file for complete search history.

(56) References Cited

U.S. PATENT DOCUMENTS

2009/0265117 A1* 10/2009 Castino ................. G06Q 10/06
702/24
2010/0198736 A1* 8/2010 Marino ............. G01N 21/3504
705/308

FOREIGN PATENT DOCUMENTS

FR          2984510 A1     6/2013

OTHER PUBLICATIONS

International Search Report for PCT/EP2016/059316 dated Jun. 28, 2016; English translation submitted herewith (6 pages).
(Continued)

*Primary Examiner* — Kyle Armstrong
(74) *Attorney, Agent, or Firm* — Fitch, Even, Tabin & Flannery LLP

(57) ABSTRACT

A facility for monitoring a geological storage site for storing a gas, such as $CO_2$ or methane, comprises, in combination, at least one geochemical measurement device (DMG), comprising a plurality of gas sampling probes (SPG) connected to a gas analyzer (AG), an electrical measurement device (DME) comprising a plurality of electrodes (ELEC) and a resistivity meter (RES), and a meteorological station (SM). The geochemical and electrical measurement devices are controlled by a logic controller (AUT). The geochemical and electrical measurement devices and the meteorological station are connected to a data collector (COLL) that is itself connected to means for transmitting said data (MTD).

30 Claims, 4 Drawing Sheets

(56) References Cited

OTHER PUBLICATIONS

C. Schutze et al: "Diagnostic monitoring to identify preferential near-surface structures for CO2 degassing into the atmosphere: Tools for investigations at different spatial scales validated at a natural analogue site", International Journal of Greenhouse Gas Control, vol. 18, Aug. 29, 2013, pp. 285-295.
C Schmidt-Hattenberger et al: "CO2 remove—Final project report Chapter 8—Ketzin test site", Jun. 30, 2012.
Li-Cor: "LI-8100A Automated Soil CO 2 Flux System Survey, Long-Term, and Multiplexed Measurements", Dec. 31, 2012.
Strazisar, BR., Wells, AW., Diehl, Jr., 2009. Near surface monitoring for the ZERT shallow CO2 injection project. Int J Greenhouse Gas Control 3(6): 736-744.

* cited by examiner

FACILITY FOR MONITORING GEOLOGICAL GAS STORAGE SITES

CROSS-REFERENCE TO RELATED APPLICATIONS

This application is a U.S. national phase application filed under 35 U.S.C. § 371 of International Application No. PCT/EP2016/059316, filed Apr. 26, 2016, designating the United States, which claims priority from French Patent Application No. 15/53.999, filed May 5, 2015, which are hereby incorporated herein by reference in their entirety.

BACKGROUND OF THE INVENTION

Field of the Invention

The present invention relates to the field of exploration and exploitation of oil deposits, or geological sites for the geological storage of gas, such as carbon dioxide ($CO_2$) or methane. More particularly, the present invention may relate to monitoring geological gas storage sites.

Description of the Prior Art

The volume of the gas injected into an underground geological formation, is easily found by measuring the flow of gas at the injection well-head. However, the evolution of the gas once injected is much more difficult to control: this gas may migrate vertically out of the storage formation (into more superficial geological layers, or even up to the surface) or laterally in the host formation into areas not initially predicted.

In the case of the geological storage of $CO_2$, the European directive 2009/31/EC requires permanent and environmentally safe storage, preventing and controlling upwellings of $CO_2$ and ancillary substances toward the surface, while limiting the interference of the underground medium. Thus, a $CO_2$ leakage rate of 0.01%/year above a site of geological sequestration of $CO_2$ is the maximum tolerated according to this directive.

In order to comply with the regulations in force, and also for assisting in the societal acceptance of this technology, it appears necessary to set up tools and systems of monitoring geological gas storage sites for detecting any possible leaks, assessing their extent, and alerting whomever it concerns. These "monitoring" ("surveillance" in French) tools must be inexpensive, highly reliable, operated with minimum human involvement, and suitable for remaining installed over long periods of time.

Numerous techniques have been developed by manufacturers for tracking the evolution of injected fluids within a porous medium.

Among these techniques, repetitive seismic survey, known as 4D seismic survey, is used in the industry (oil or environmental). Such a technique carries out various seismic campaigns, at various times (in general the campaigns are spaced at least a year apart, but permanent acquisition devices exist). Thus, tracking the evolution of the movements and pressures of the fluids in the geological storage site is possible. This technique has been used in the environmental field for estimating, on the basis of the seismic data, the total volume and total mass of gas in place in the subsoil. However, this method, which is quite lengthy to implement and suffering from a high indeterminacy at low depth, is not suitable for detecting near-surface gas leakages in real time. In addition, this technique is limited to the detection of the gas phase and not the dissolved phase.

The subject matter of patent EP 12290058 relates to a method for storing gas, such as carbon dioxide ($CO_2$) or methane, comprising a phase of monitoring the evolution of the gas. It makes it possible to quantify the mass of dissolved gas, optionally the quantity of precipitated gas, and to anticipate a leakage of this gas above the storage site. The method is based on adjusting a model describing the evolution of the gas concentration as a function of time, by means of geochemical analyses in situ of rare gases contained in fluid phases of samples of the subsoil.

French Patent FR 2984510 is also known, which relates to a facility for the analysis and determination of the flows of $CO_2$ which makes it possible notably to discriminate the flow of $CO_2$ of deep origin from natural biological $CO_2$, generated close to the surface. This facility is characterized by a surface weather station provided with a chamber for collecting surface gases, with three means of sampling at three different depths in the soil, means of measuring the concentration of $CO_2$, $N_2$, and $O_2$ at said three depths, and means of measuring the concentration of $CO_2$ contained in the gas collected in the collection chamber. This facility has the advantage of taking into account a baseline, representative of the natural emissivity of $CO_2$.

The document "STRAZISAR, B R., WELLS, A W, DIEHL, J R., 2009. *Near surface monitoring for the ZERT shallow CO2 injection project. Int J Greenhouse Gas Control* 3(6): 736-744." demonstrates that a leakage of $CO_2$ may cause a local decrease in electrical resistivity above the leakage of $CO_2$. This decrease is interpreted as being linked to a decrease in the electrical resistivity of the interstitial water, caused by the dissolution of the $CO_2$ in this interstitial water.

Thus, the methods, devices, and facilities according to the prior art are limited to a single type of measurement (seismic, geochemical, or electric) for detecting gas leakages. In addition, none of these documents describes either means for automating these measurements or means for long term, remote monitoring, of a geological gas storage site.

SUMMARY OF THE INVENTION

The present invention provides a facility for monitoring geological gas storage sites combining, in a totally integrated way, two types of measurements, specifically geochemical and electrical measurements. In addition, the facility according to the invention is fully automated and includes a system of transmitting the information collected by the facility. The facility according to the invention thus allow continuous and optionally remote monitoring of geological gas storage sites.

In general, the subject matter of the invention relates to a facility for monitoring a geological gas storage site for storing a gas, such as $CO_2$ or methane. The facility comprises at least the following elements in combination:

a geochemical measurement device, comprising a plurality of gas sampling probes, the probes being connected to a gas analyzer, and being configured to be placed near the surface;

an electrical measurement device, comprising a plurality of electrodes, the electrodes being connected to a resistivity meter, the electrical measurement device providing electrical measurements in the subsoil; and a surface weather station for the measurement of environmental parameters associated with the site, and wherein the geochemical and electrical measurement devices being controlled by a logic controller, the geochemical measurement device, the electrical measurement device and the weather station being connected to a data collector, the collector being connected to means of transmitting the data.

According to one embodiment of the invention, the gas sampling probes may be installed above the vadose zone and below the biogenic gas production zone.

According to one embodiment of the invention, the gas sampling probes are connected to a gas analyzer via gas transfer.

According to one embodiment of the invention, the gas transfer means of the geochemical measurement device may comprise a three-way solenoid valve, a first way being connected to one of the gas sampling probes, a second way coupled to a purge system of the geochemical measurement device, and a third way being connected to a pump, the pump pumping the gas sampled by the sampling probes and for distributing the sampled and pumped gas to the geochemical measurement device.

According to one embodiment of the invention, the gas analyzer may comprise at least one detector of the stored gas and at least one detector of a rare gas.

According to one embodiment of the invention, the resistivity meter of the electrical measurement device may cause a DC electrical current to flow into the subsoil via two of the electrodes and may record a difference of electrical potential between two others of the electrodes.

According to one embodiment of the invention, the logic controller may trigger electrical measurements via the electrical measurement device and geochemical measurements via the geochemical measurement device regularly over time.

According to one embodiment of the invention, the electrodes may be placed according to at least one of on the surface of the ground, along the walls of an underground cavity, and along a well.

According to one embodiment of the invention, the weather station may provide a continuous check of at least temperature, pressure, rainfall and humidity.

According to one embodiment of the invention, the electrical power supply of the facility may be provided by a solar panel, connected to a battery.

According to one embodiment of the invention, the means of transmitting the data may be provided by a 3G modem.

Furthermore, the invention relates to a use of the facility according to the invention for monitoring a geological gas storage site for storing a gas, such as $CO_2$ or methane.

According to one embodiment involving the use of the facility according to the invention, calibration is carried out prior to the injection of gas into the geological storage site for storing a gas.

Other features and advantages of the method according to the invention will appear on reading the description below of non-restrictive embodiments, referring to the appended figures and described below.

BRIEF DESCRIPTION OF THE INVENTION

DETAILED ILLUSTRATION OF THE INVENTION

One of the subject matters of the invention relates to a facility for monitoring geological gas storage sites for storing gas, such as carbon dioxide ($CO_2$) or methane, which allows the detection of leakages of gas, in a quantitative, integrated, permanent way and without human intervention.

Geological gas storage, comprises a phase of injection of the gas into a formation of the subsoil, and a phase of monitoring the evolution of the gas to be stored in the subsoil. The injected gas essentially contains one type of gas to be stored (carbon dioxide ($CO_2$), methane, etc.), but often, at least one rare gas (helium, argon, etc.) is also present, co-injected simultaneously with the gas to be stored.

Figure 1:
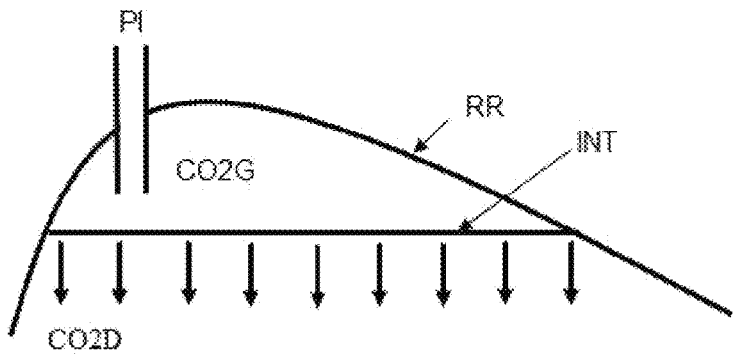
FIG. 1 is an illustrative diagram of the injection of a gas into a geological gas storage site.

FIG. 1 illustrates an example of injection of a gas, via an injector well (PI), in a reservoir rock (RR) of a formation of the subsoil, the gas essentially containing the gas to be stored, $CO_2$, and the rock reservoir containing a fluid, notably water.

When the $CO_2$ is injected, it migrates into the formation initially mainly in gaseous form ($CO_2G$) by gravity and due to an existing pressure gradient, until halting for the following reasons: disappearance of the pressure gradient by flow, retention of the residual gas by capillarity, retention of the gas in a structural manner. Once the gas phase has stabilized in the pores, the plume of $CO_2$ ultimately has a large horizontal surface area with respect to its thickness.

The second migration phenomenon that takes over is diffusion with or without gravity instability. This type of migration has its source in the gas/water interface (INT), accordingly below the plume of $CO_2$ gas ($CO_2G$) in the reservoir rock, but also above the plume of $CO_2$ through the cap rock. Under this interface $CO_2$ is therefore found in dissolved form in water ($CO_2D$), and transported downward by diffusion (arrows in FIG. 1).

Figure 2:
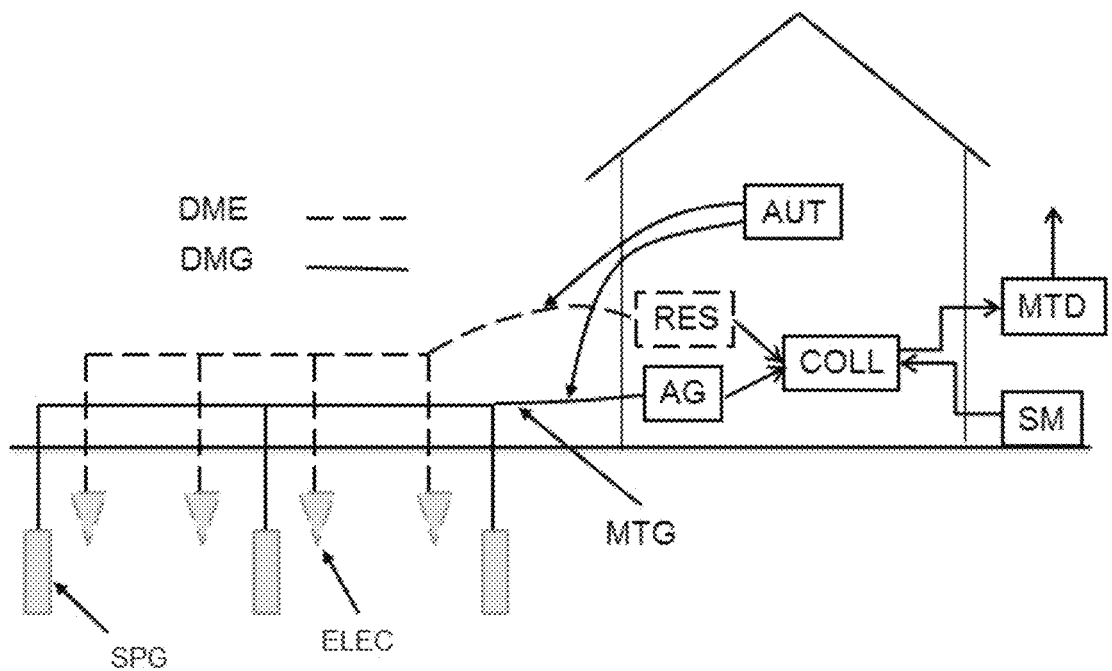
FIG. 2 illustrates a non-restrictive embodiment of the invention.

FIG. 2 depicts a non-restrictive embodiment of the invention. The elements of the invention are capable of being arranged differently.

The invention comprises a geochemical measurement device DMG. The geochemical measurement device DMG includes a plurality of gas sampling probes SPG with the probes being connected to a gas analyzer AG. In a preferred way, the gas sampling probes SPG are connected via gas transfer means MTG to the gas analyzer AG. Preferably the gas sampling probes SPG are placed at the near surface, that is the meters just below the surface of a site. The geochemical gas measurement device DMG according to the invention allows a sampling of gas locally, that is near the location of the sampling probes SPG. The gas analyzer AG allows the detection and quantification (estimate of concentration, for example) of at least one type of gas. Preferably, the gas analyzer allows the detection and quantification of gas injected into the geological storage site.

The facility according to the invention also comprises an electrical measurement device DME, which provides electrical measurements in the subsoil. This device includes a plurality of electrodes ELEC connected to a resistivity meter RES. The electrodes of the electrical measurement device DME may be installed wholly or partly on the surface of the ground, along walls of an underground cavity or along a wellbore. The resistivity meter RES of the electrical measurement device DME comprises a DC electrical current (e.g. between 5 and 200 mA) generator and a voltmeter for measuring a difference in electrical potential. According to one embodiment of the present invention illustrated in FIG. 2, the electrodes ELEC are at least four in number, the resistivity meter RES transmits the electrical current into the subsoil via at least two of the electrodes ELEC and measures the difference in electrical potential, induced in the subsoil by the injected current, via at least two others of the electrodes ELEC.

Furthermore, the facility comprises a surface weather station SM, for accessing environmental parameters (such as temperature, pressure, rainfall, wind speed, etc.) associated with the site.

Moreover, the geochemical DMG and electrical DME measurement devices are controlled by a logic controller AUT. The logic controller AUT may thus be used to preprogram the measurements to be carried out, whether they are electrical or geochemical. The logic controller AUT may, for example, be used to define a sequencing of the geochemical measurements, by triggering, successively over time, according to a given periodicity, the sampling of gas probe after probe, as well as the transfer and analysis of the gas. Similarly, the logic controller AUT may be used to trigger electrical measurements with a certain periodicity, according to certain parameters (number of electrodes involved in the measurement, of the injected electrical current, etc.).

Furthermore, the geochemical measurement device DMG, the electrical measurement device DME and the weather station SM are connected to a data collector COLL. The data collector COLL makes it possible to collect, centralize and store all of the measurements carried out by the facility according to the invention.

In addition, the collector COLL is itself connected to means of transmitting the data MTD. The means of transmitting the data MTD allows a transfer of information collected by the collector COLL.

The invention may be placed directly above the geological gas storage site. Advantageously, the sampling probes SPG of the geochemical measurement device DMG and the electrodes ELEC of the electrical measurement device DME are distributed according to results of predictive modeling of the evolution (evolution in size, but also in lateral and vertical displacement) of the gas plume. Such predictive modeling may be carried out using of a numerical simulator of gas flow in a porous medium.

Thus, the invention makes it possible, inter alia, to take, automatically and preprogrammed via the logic controller AUT, samples of gas via probes SPG, and analyzing the sampled gas. When the probes are placed at the surface or near surface of the geological gas storage site, the invention makes it possible to detect the arrival of gas at the (near) surface of a geological storage site and to qualify and to quantify this gas. By performing such geochemical measurements repeatedly over time via the logic controller AUT, the geochemical measurement device DMG allows the monitoring over time for possible leakages of $CO_2$ arriving at the (near) surface.

Furthermore, the invention makes it possible to automatic carrying out of preprogrammed electrical measurements, via the logic controller AUT. In general, the electrical measurements provide, in a non-invasive manner, a mapping of the electrical response of the subsoil above which an electrical device is located. The investigation depth of electrical methods varies from ten to one hundred meters, according to the parameters of the electrical measurement devices that are implemented. By performing such electrical measurements repeatedly over time via the logic controller AUT, the electrical measurement device makes it possible to detect the changes in electrical properties in the investigated subsoil. By combining these changes with other types of information, these changes can be interpreted as due or not due to a leakage of the gas stored in the geological gas storage site.

According to the invention, the weather station may be used to provide a continuous check over time of environmental parameters (e.g. temperature, wind speed and direction, humidity, pressure, sunshine index, rainfall). These parameters make it possible to take into account climatic events occurring at the surface of a geological gas storage site during the interpretation of the measurements from the electrical and geochemical devices. For example, thanks to these measurements, it may be taken into account the rainfall measurement for correcting the measurements of the electrical properties of the subsoil for a rise or a deficit in the quantity of water in the near subsoil. Similarly, an increase of water in the near subsoil will have an impact on the concentration of gases sampled in the (near) surface, an impact that may be quantified. In general, the continuous measurements of environmental parameters carried out by the weather station according to the invention may enable the establishment of a baseline representative of the climatic effects on the geochemical measurements and the electrical measurements. In case of gas leakage, the effects due to this leakage on the electrical measurements and on the geochemical measurements will be added to the baseline representative of the climatic effects on the geochemical measurements and on the electrical measurements.

According to one embodiment of the present invention, the weather station provides a continuous check of at least temperature, pressure, humidity and rainfall.

According to the invention, the data collector COLL makes it possible collection of all the data measured automatically and periodically by the geochemical measurement device DMG, the electrical measurement device DME and the weather station SM. These data are then transmitted in real time by a data transmission system MTD.

Thus, the facility according to the invention allows, inter alia, the coupling of different measuring devices (electrical, geochemical and meteorological) into one single coherent system. In addition, the invention is fully automated, which includes the automation of the measurements as well as the transmission of the collected information. This automation in a coupled system allows a synchronization of the different types of measurements, which is not feasible for a non-integrated system or a non-automated system. Generally, such a facility allows a reliable detection of gas leakages that may occur as a result of an injection of gas into a geological gas storage site. The reliability of the detection is ensured by the fact that the different types of information (electrical, geochemical, and weather) may be collected coordinately (inter alia, the facility according to the invention allows the synchronization of the different types of measurements), at the same location (the coverage area of the geochemical measurement device DMG may cover the coverage area of the electrical measurement device DME), regularly (allowing a continuous tracking of a site), and automatedly (thus avoiding human errors). In addition, since the invention makes it possible to provide different types of information (electrical, geochemical and weather), after cross-analysis of the information, to discern whether or not measurement anomalies detected by one or more of the devices are related to a leakage of the injected gas.

Description of the Geochemical Measurement Device

According to one embodiment of the present invention, the gas sampling probes SPG are installed above the vadose zone (so that the samples are in the form of free gas and not in the form of dissolved gas) and below the biogenic gas production zone (so that the gas measurements are not polluted by natural gas production, related to the degradation of organic matter in the near surface). In the case where the gas injected into the geological storage site is $CO_2$, this notably allows the gas samplings to be carried out below the zone of biogenic production of $CO_2$. Indeed, the bacterial and plant biological activity that develops in the near surface of the subsoil is a $CO_2$ emission system. By being placed below the zone of biogenic production of $CO_2$, the measurements carried out by the gas sampling probes SPG are less affected by the natural emission of $CO_2$ and are therefore more reliable.

According to one embodiment of the present invention, the gas transfer means MTG of the geochemical measurement device DMG comprises a three-way solenoid valve, a first way being connected to one of the gas sampling probes SPG, a second way being connected to a purge system of the geochemical gas measurement device DMG assembly, and a third way being connected to a pump. The use of a solenoid valve allows flows of gas to be sampled by the probes SPG under control of by the logic controller AUT. The pump in turn allows the sampled gas to be pumped and distributed toward the gas analyzer AG. The purge system, for example, lets the gas present within the gas transfer means MTG escape, into an ancillary system for a few minutes. According to another embodiment of the present invention, the purge system injects (under pressure) a neutral gas into the geochemical measurement device DMG assembly. According to one embodiment of the present invention, the neutral gas is atmospheric air. According to one embodiment of the present invention, the neutral gas is nitrogen. In general, the purge system ensures that the next measurement is not affected by gas residues from the previous measurement.

According to another embodiment of the present invention, the gas transfer means MTG of the geochemical measurement device DMG comprises a two-way solenoid valve having a first way connected to one of the gas sampling probes SPG and a second being connected to a pump for the distribution of the sampled gas to the gas analyzer AG.

According to one embodiment of the present invention, a flow restriction valve is placed between the pump of one of the means of transfer and the gas analyzer. The flow restriction valve makes it possible to ensure a low and constant flow of gas at the inlet of the gas analyzer AG.

According to one embodiment of the present invention, the gas analyzer comprises at least one detector (for detection and quantification) of the gas stored in the geological storage site and at least one detector (for detection and quantification) of a rare gas.

According to one embodiment of the present invention, the rare gas detector is a detector of radon, helium, neon, argon, krypton, or xenon.

According to a particular implementation of the invention, the number of gas sampling probes SPG is between 20 and 40. Advantageously, the gas sampling probes SPG are equally distributed so as to cover a surface area of the order of 1000 $m^2$. The gas sampling probes SPG may be also distributed according to results of predictive modeling of the evolution of the gas plume. Thus, by multiplying the number of sampling probes SPG and by distributing the sampling makes over a large surface area of the geological $CO_2$ storage site, the monitoring of the site is improved.

Description of the Electrical Measurement Device

According to the invention, the electrical measurement device DME may be used to estimate the resistivity of the subsoil. The electrical resistivity of the subsoil essentially depends on the water content of the rock (a function of porosity and saturation), the salinity of the interstitial water (and therefore the quantity of gas dissolved in this interstitial water) and the clay content of the rocks. The principle of the method is based on the measurement of differences in electrical potential associated with the injection of a DC electrical current. The "apparent" electrical resistivity, a function of the geometrical characteristics of the electrical device DME, can be calculated via Ohm's law. This value is the result of the contribution of all the portions of the medium that are traversed by the current transmitted at the surface. Thus, the measurement represents a value which integrates the resistivities over a certain volume of the subsoil. The acquisition technique carries out measurements (along multiple 1D acquisition profiles, or according to 2D acquisition devices) by regularly increasing the space between the electrodes. The field measurements thus make it possible to obtain an image (2D or 3D, where one of the dimensions is the depth) of the apparent electrical resistivity of the subsoil. On the basis of data inversion software (then the term used is resistivity tomography), which for example is based on the method of least squares, an image (2D or 3D, where one of the dimensions is the depth) of the true electrical resistivity of the subsoil may be acquired. Conventionally, the investigation depth of electrical methods is of the order of ten to one hundred meters, according to the parameters of the electrical measurement devices implemented (lengths of the profiles, injected electrical current, etc.).

According to the invention, the electrical measurement device DME may further be used to estimate the chargeability of the subsoil. To do this, a DC electrical current is injected into the subsoil via the resistivity meter RES, and the decay is measured, via the resistivity meter RES, of the evolution of the voltage in the subsoil over time, once the current flow has stopped. In the same way as for electrical resistivity, an inversion process is necessary in order to obtain a 2D or 3D image of the chargeability of the medium.

According to one embodiment of the present invention, the electrodes ELEC are connected to the resistivity meter RES via a multiplexer. The multiplexer makes possible to referencing each of the electrodes and selection, among all of the deployed electrodes, the electrodes required for a given measurement. The multiplexer also makes it possible to communicate to the resistivity meter a sequence of measurements to be carried out.

According to one embodiment of the present invention, the resistivity meter used is the TERRAMETER SAS4000 model marketed by ABEM.

According to the invention, an acquisition configuration of the electrical device DME may be selected that is suited to a given objective. A selected acquisition configuration according to the present invention, is the number of electrodes ELEC required for a given measurement, the number of electrodes ELEC deployed, the spacing between the electrodes ELEC and their spatial arrangement. According to one embodiment of the present invention, the electrodes ELEC deployed for a measurement are arranged in a straight line (this is referred to as a 1D acquisition profile), on the surface of the ground (this is referred to as a 2D acquisition profile) or along at least two wellbores (this is referred to as a well acquisition). Moreover, a favored configuration is a quadrupole configuration (two transmitting electrodes and two receiving electrodes, known as a Wenner-Schlumberger configuration) in the case of a 1D acquisition profile, a dipole-dipole and pole-pole acquisition profile (with 2 electrodes at infinity) in the case of 2D acquisition profiles. The number of deployed electrodes ELEC and the spacing between these electrodes are determined according to the desired depth of penetration, the expected resolution and ambient electrical background noise. Thus, if D is the spacing between the electrodes and N the number of electrodes, then the investigation depth of such a device is about $(N-1)*D/5$ (it also depends on the device used and the resistivity of the rocks), and the resolution of the image that may be obtained by surface resistivity tomography is equal to D.

According to one embodiment of the present invention for which the electrodes ELEC of the electrical measurement device DME are placed on the surface of the ground, on the basis of these measurements and after performing a resistivity tomography, an image is obtained of the resistivity beneath the surface of the ground and down to a depth that varies according to the configuration of the electrical measurement device.

According to another embodiment of the present invention for which the electrodes ELEC of the electrical measurement device DME are distributed into at least two wells, on the basis of these measurements and after performing a resistivity tomography, an image may be obtained of the resistivity between the wells in which the electrodes are placed.

According to one embodiment of the present invention, the logic controller AUT triggers an electrical measurement by the electrical measurement device DME every 3 hours. In this way, it is possible to track the temporal evolution of the resistivity and the chargeability of the investigated subsoil.

According to a particular implementation of the invention, the number of electrodes ELEC is 64 and the electrodes are spaced 25 cm apart.

Description of the Ancillary Elements

According to a preferred implementation of the present invention, the data collector COLL corresponds to the model DT85GLM marketed by DIMELCO.

According to a preferred implementation of the present invention, the facility comprises three gas detectors: a $CO_2$ detector (e.g. the detector LI-820 marketed by LI-COR), a radon detector (e.g. the aerosol sampler EAS 70K marketed by ALGADE), and a rare gas detector (a mass spectrometer). Preferably, the rare gas detector allows the detection and quantification of the quantity of radon, helium, neon, argon, krypton, or xenon present in the atmosphere.

According to one embodiment of the present invention, the means of transmitting data MTD allows the transmission of the collected data to an in situ means of analyzing the collected data. This may thus be a wired connection or a wireless connection (Bluetooth, Wi-Fi, etc.), allowing, for example, an in situ connection of a computer to the facility and thus the analysis of the collected data.

According to one embodiment of the present invention, the means of transmitting the collected data MTD are remote transmission means (a modem allowing an Internet connection, for example). Preferably, the means of transmitting the data MTD collected by the collector COLL are provided by a 3G modem.

Thus, the facility according to the invention makes it possible for the data collected on the site to be transmitted automatically and in real time, thus permitting ad hoc decisions in case of detection of gas leakage.

According to one embodiment of the present invention, the data collector COLL makes it possible to take account for alert trigger thresholds and which can trigger an alert. Thus, if a quantity of $CO_2$ greater than a set threshold is detected in at least one sampling probe, the data collector is able to launch an alert, to a specialist, the public authorities, via an e-mail message, a sound alert, etc.

According to one embodiment of the present invention, once the quantification of gas has been carried out by the gas detector (DG), the resulting information is processed via software for converting the measurement (e.g. in mV) into a digital value, and is then recorded by the data collector. The software may be simple spreadsheet software, or be specific to the gas analyzer.

According to one embodiment of the present invention, the electrical power supply of the facility is provided by a solar panel, and is connected to a battery.

According to another embodiment of the present invention, the logic controller AUT, the gas analyzer AG, the data collector and the resistivity meter are protected in a waterproof shelter.

According to one embodiment of the present invention, the invention may comprise a means of measuring the soil moisture. Such measurements may indeed make possible correction of the electrical measurements carried out with the electrical measurement device DME for the effects caused by variations of the moisture level in the ground.

Thus, the present invention is based on the coupling of multiple types of measurement devices in a single coherent facility, controlled by a logic controller, allowing automatic, permanent and reliable monitoring of geological gas storage sites.

Use of the Invention

The invention also relates to the use of the invention for monitoring a geological gas storage site for storing gas, such as carbon dioxide ($CO_2$) or methane, in order to detect possible leakages of this gas.

Preferably, the use of the invention for monitoring a geological gas storage site may require carrying out a step of calibrating invention prior to the monitoring phase per se. Alternatively, the facility according to the invention may be used for monitoring a geological storage site into which the gas is already injected.

Calibration

According to one implementation of the present invention, the calibration of the invention is carried out prior to the injection of the gas into the geological gas storage site.

According to one implementation of the present invention, the calibration according to the invention carries out measurements for a predefined period via the construction according to the invention. More precisely, measurements are performed for a predefined period with the electrical DME and geochemical DMG devices prior to the injection of gas into the geological storage site, so as to establish:
 A reference level for the geochemical measurements, reflecting the natural geochemical activity of the site (related to the degradation of organic matter, to climatic changes over time, etc.);

A reference level for the electrical measurements, reflecting the variations in electrical properties specific to the site (related essentially to climatic changes over time).

Preferably, the measurements performed for the calibration of the facility are carried out over a period of between one year and three years.

According to one implementation of the present invention, the electrical device DME of the facility may be calibrated according to the invention via experiments conducted in the laboratory on rock samples from the geological gas storage site in question. Thus, according to a particular implementation of the present invention, after the sample is dried, it is saturated under vacuum with water containing 1 g/l of NaCl then placed in a "Hassler" cell (e.g. Ergotech Mk4). This equipment makes possible both to progressive desaturation of the rock sample by applying a capillary pressure and to carrying out measurements of the electrical resistivity between 20 Hz and 2 MHz using an impedance meter (e.g. Agilent E4980A). The desaturation may be carried out by using two different gases, whereof the gas to be injected is, for example, an inert gas such as nitrogen, in order to highlight the influence of the gas to be injected on the electrical parameters (resistivity index, critical frequency, spontaneous potential). More precisely, the resistivity values obtained in these experiments conducted in the laboratory make it possible to determine a threshold beyond which a change in resistivity measured by the electrical measurement device DME may be interpreted as being due to the presence, at the electrical measurement device DME, of the injected gas.

According to one implementation of the present invention, the calibration of the invention includes measurements carried out in situ according to the invention by simulating one or more gas leakages. These simulations of gas leakages may be carried out by injecting the gas into a wellbore, e.g. between 3 and 5 m deep. It is possible, for example, to simulate a sudden leakage (by injecting the gas under high pressure) or a diffuse leakage. The measurements carried out by the geochemical DMG and electrical DME measurement devices in the course of these leakage tests make possible on one hand calibration of the electrical measurements with respect to the geochemical measurements, but also, defining gas leakage detection thresholds, with respect to the previously established reference levels.

The calibration between the geochemical measurements and the electrical measurements determines the law of correlation between the quantities of gas measured by the geochemical measurement device DMG and the variations in electrical resistivity measured by the electrical measurement device DME. According to one embodiment of the present invention, a graph is drawn up representing the quantities of gas measured by the geochemical measurement device DMG on the abscissa and the variations in electrical resistivity measured by the electrical measurement device DME on the ordinate. Then, by linear regression, an experimental law is determined representative of the correlation between these two types of measurements. The defined experimental law defined between these two groups of data makes it possible to carry out a cross-check on the measurements of the two devices. Thus, if one of the devices detects an abnormal measurement and if the measurement carried out by the other device is below the prediction obtained by the experimental law, it is probable that the abnormal measurement is a one-off anomaly, unrelated to a gas leakage.

According to one embodiment of the present invention, the gas leakage detection thresholds which are defined are supplied to the data collector in order to trigger a remote alert in case of a gas leakage.

According to one embodiment of the present invention, the step of calibrating the invention is continued during the injection phase and during the first years after the injection of gas.

Monitoring

In the course of the step of monitoring a geological gas storage site via the invention, the evolution of the measurements carried out by the invention should be monitored. The invention allows time tracking of the electrical, geochemical and environmental characteristics of a geological gas storage site.

According to one embodiment of the present invention, the step of monitoring a geological gas storage site by the invention is implemented by using the invention to automatically make, regular and remote measurements.

Based notably on the measurements carried out by the electrical measurement device DME according to the invention, resistivity tomography, an imaging (in 2D, or 3D according to the acquisition configuration) of the diffusion of the gas injected into the subsoil can be determined. In addition, since the measurements can be repeated over time, the temporal evolution of resistivity can be obtained. The changes in resistivity observed over time may be an indicator of movements of the injected gas. When these changes in resistivity measured by the electrical measurement device DME are correlated with changes in gas concentration measured by the geochemical measurement device DMG, then the probability of a gas leakage is high. An alert may then be launched. When changes in resistivity measured by the electrical measurement device DME are not correlated with a change in gas concentration measured by the geochemical measurement device DMG, and the changes in resistivity are observed at the investigation depth of the geochemical measurement device DMG, then, for example, it may be concluded from this of the geochemical measurement device DMG, then, for example, it may be concluded from this that it is a one-off measurement anomaly. When changes in resistivity measured by the electrical measurement device DME are not correlated with a change in gas concentration measured by the geochemical measurement device DMG, and the changes in resistivity are observed at an investigation depth greater than that of the geochemical measurement device DMG, then it may be surmised that a gas leakage is forthcoming or imminent, and is optionally able to alert whomever it concerns.

Thus, the present invention notably makes it possible to combine, into a single, coherent and integrated form, the information obtained by a geochemical measurement device DMG with information obtained by an electrical measurement device DME and therefore to carry out reliable monitoring of a geological gas storage site. Indeed, this cross-checked information allows better detection of gas leakages that may occur as a result of an injection of gas into a geological gas storage site, or even these leakages to be anticipated thanks to the different investigation depths of the two types of measurements. In addition, the invention may be fully automated and remotely controlled, which allows permanent monitoring of a geological gas storage site.

Example of Application

FIGS. 3 through 6 illustrate an example of an application according to the invention for monitoring a geological $CO_2$ storage site. The site in question is a limestone quarry. $CO_2$ has been injected into a cavity inside this quarry.

Figure 3:
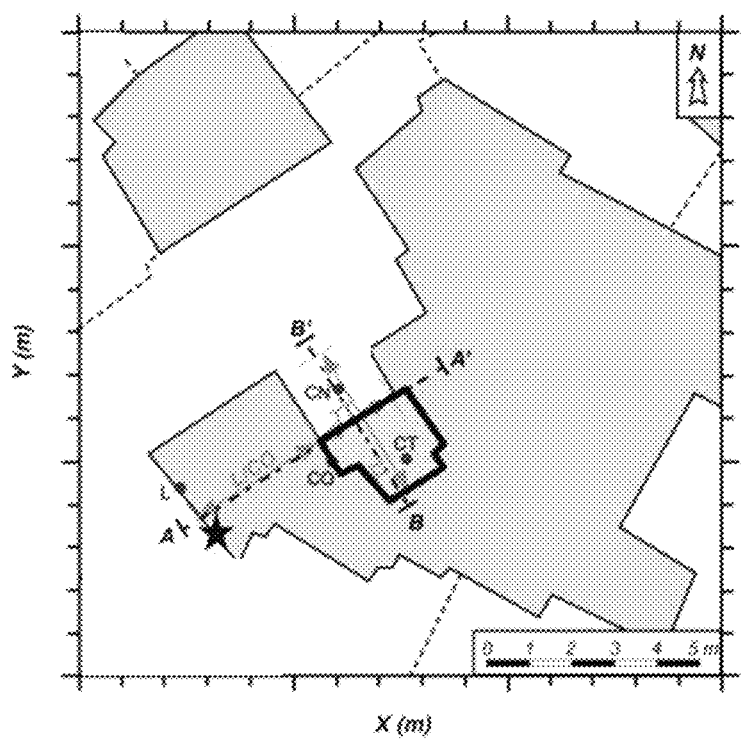
FIG. 3 illustrates a surface plan of a geological $CO_2$ storage site, as well as the location of the elements of an embodiment of the invention.

FIG. 3 depicts a surface plan of the injection area. The gray areas correspond to the limestone pillars of the quarry and the injection chamber corresponds to the central area framed in bold. This figure depicts the location of two profiles of surface electrical resistivity measurements (AA' and BB'), as well as three profiles of electrical resistivity measurements in the cavity (TL, TT and L-CO), the location of $CO_2$ detectors (CN, CO, CT, L), and the location of the weather station placed at the surface (represented by a star).

Figure 4:
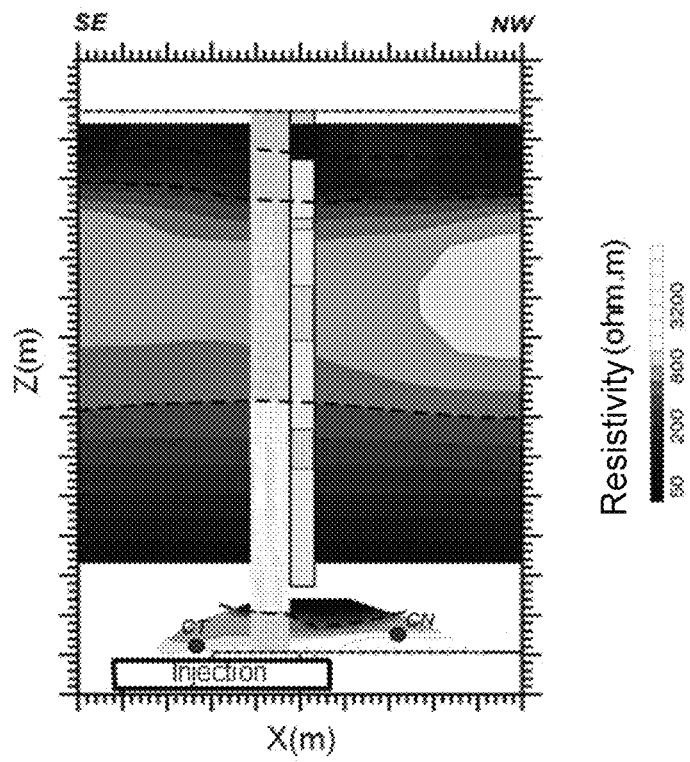
FIG. 4 depicts the results of electrical resistivity tomography obtained before injection of $CO_2$ on the based on the implementation of the invention as illustrated in FIG. 3.

FIG. 4 depicts a result of electrical resistivity tomography carried out along the profile BB' before the injection of $CO_2$, on which a result of resistivity tomography carried out along the profile TL (at the roof of the cavity) has been superimposed, together with the location of the $CO_2$ detectors CT and CN. The dotted line represents the boundary between the clays and limestone. These maps of variations in resistivity in the subsoil of the selected geological $CO_2$ storage site constitute the reference with respect to which the maps will be analyzed of variations in resistivity which will be carried out during and after the injection of $CO_2$.

Figure 5:
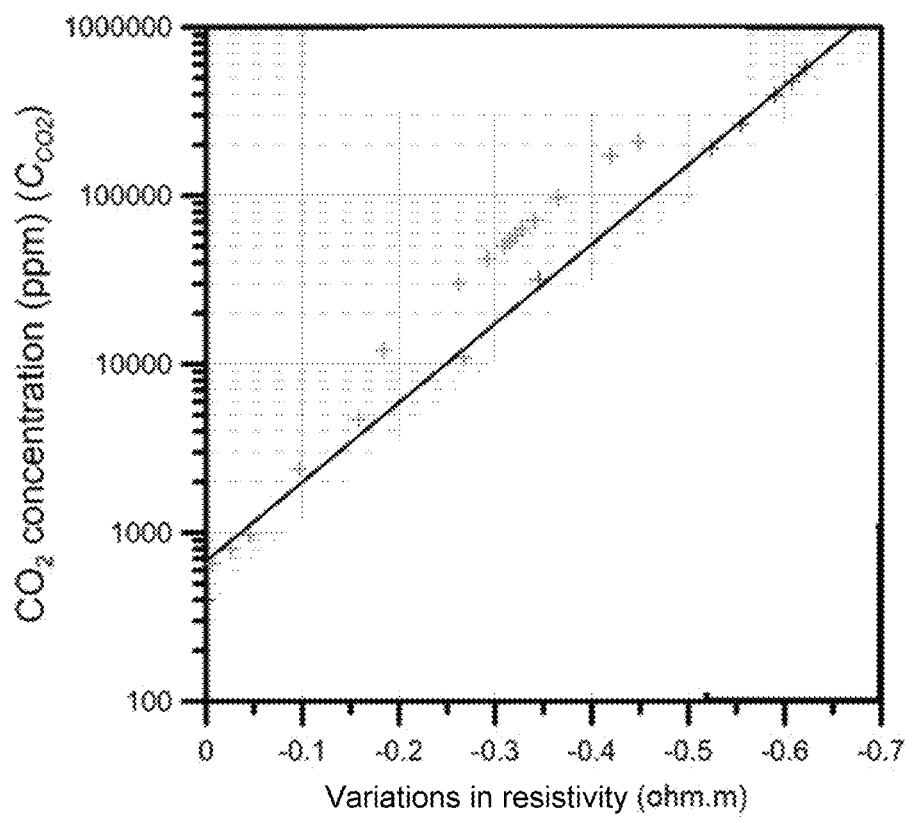
FIG. 5 depicts variations in concentrations of $CO_2$ as a function of relative variations in electrical resistivity obtained after injection of $CO_2$ on the based on the implementation of the invention as illustrated in FIG. 3.

FIG. 5 represents (via "+" signs) the variations in $CO_2$ concentrations measured by the $CO_2$ sensors CN and CT as a function of the relative variations in electrical resistivity measured along the section B-B', obtained over time, in a calibration phase carried out before and during the injection. It may be observed that the geochemical and electrical measurements are very strongly correlated with each other. On the basis of this graph, a law of correlation may then be obtained between these two types of measurements, e.g. by a linear regression.

Figure 6:
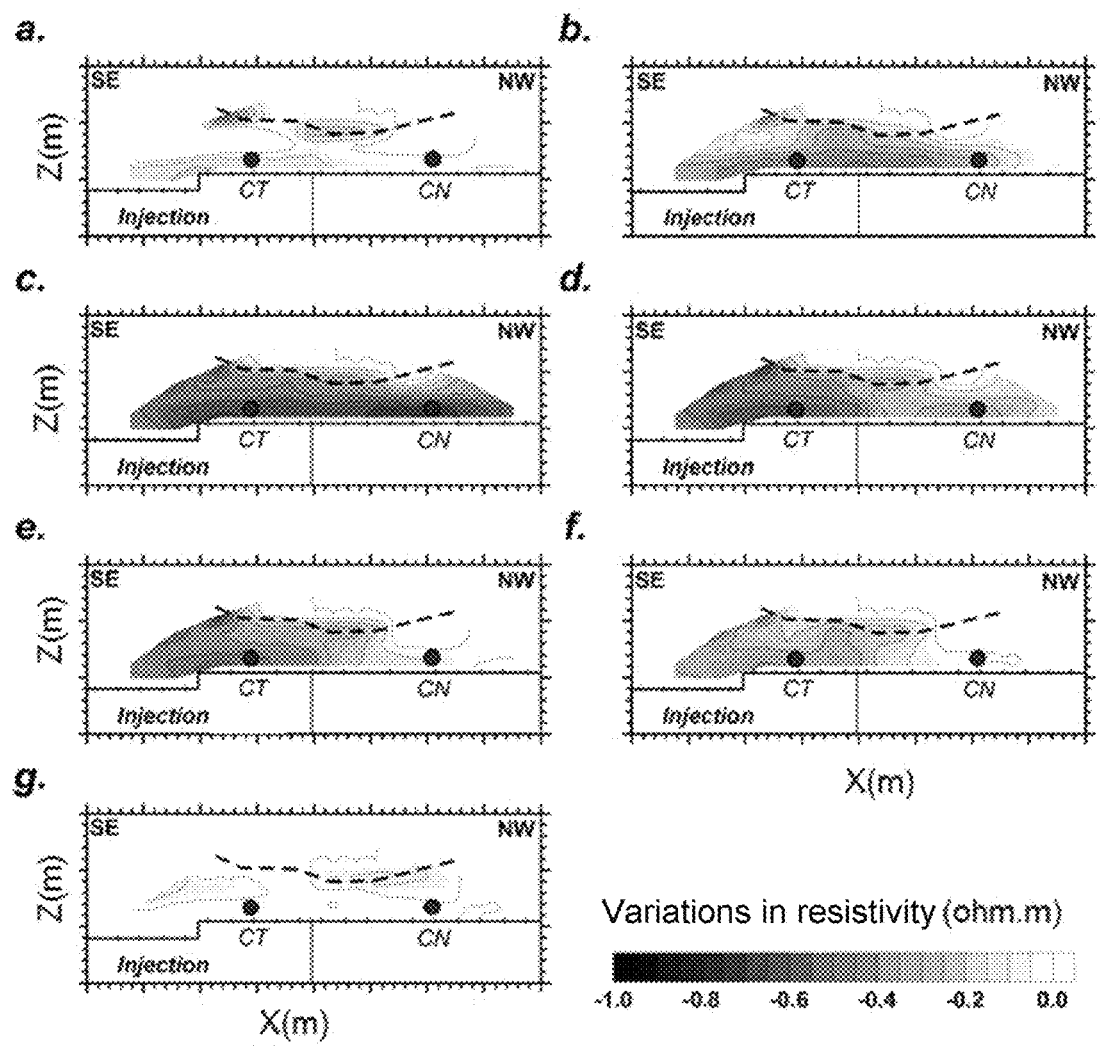
FIG. 6 depicts the evolution over time of the relative variation in electrical resistivity obtained after injection of $CO_2$ based on the invention as illustrated in FIG. 3.

FIG. 6 depicts the evolution over time of the relative variation in electrical resistivity along the profile TL (at the roof of the cavity), after $CO_2$ injection ((a) t=0.1 day, (b) t=0.2 day, (c) t=0.4 day, (d) t=1 day (e) t=10 days, (f) t=40 days and (g) t=100 days after the start of the injection). These maps of variation in resistivity in the subsoil were obtained on the basis of a resistivity tomography carried out at each instant t, the reference of the variations being taken with respect to the map depicted in FIG. 4. It may be observed in this figure that the variations in resistivity are maximum at t=0.4 d.

Thus, the correlation between the geochemical measurements and the electrical measurements observed in FIG. 5 confirms the utility of a facility allowing a coherent coupling, in a single facility, between a geochemical measurement device DMG and an electrical measurement device DME. In addition, since the facility according to the invention is fully automated, continuous monitoring is possible, during the injection, as depicted in FIG. 6, but also after the injection. Thus, the facility according to the invention may be used to detect the precursor signs of a leakage, by identifying anomalies in the maps of relative resistivity in at least one of as depicted in FIG. 6, and detecting abnormal gas concentrations. By coupling electrical and geochemical information, the invention helps to clarify possible ambiguities concerning the interpretation of abnormal (geochemical and/or electrical) measurements, but also helps to locate potential gas leakages more reliably.

The invention claimed is:

1. A system for monitoring a geological gas storage site for storing a gas, comprising:
    a geochemical measurement device comprising a plurality of gas sampling probes, the probes being connected to a gas analyzer and configured for placement above a vadose zone of ground at the geological gas storage site and below a biogenic gas production zone of the ground at the geological gas storage site;
    an electrical measurement device comprising a plurality of electrodes connected to a resistivity meter for taking electrical measurements in subsoil at the geological gas storage site;
    a surface weather station for providing measurement of environmental parameters associated with the geological gas storage site; and wherein
    the geochemical and electrical measurement devices are controlled by a controller and the geochemical measurement device, the electrical measurement device and the weather station are connected to a data collector which is connected to means for transmitting data acquired from the measurement devices.

2. The system as claimed in claim 1, wherein the gas sampling probes are connected to a gas analyzer by means for transferring gas.

3. The system as claimed in claim 2, wherein the means for transferring gas comprises a three-way solenoid valve, with a first way being connected to one of the gas sampling probes, a second way being connected to a purge system of the geochemical measurement device and a third way being connected to a pump for pumping gas sampled by the sampling probes and for distributing the gas to the geochemical measurement device.

4. The system as claimed in claim 3, wherein the resistivity meter transmits DC electrical current into the subsoil via two of the electrodes and records a difference in electrical potential between two other of the electrodes.

5. The system as claimed in claim 2, wherein the gas analyzer comprises at least one detector of the stored gas and at least one detector of a rare gas.

6. The system as claimed in claim 5, wherein the resistivity meter transmits DC electrical current into the subsoil via two of the electrodes and records a difference in electrical potential between two other of the electrodes.

7. The system as claimed in claim 2, wherein the resistivity meter transmits a DC electrical current into the subsoil via two of the electrodes and records a difference in electrical potential between two others of the electrodes.

8. The system as claimed in claim 2, wherein the controller regularly over time triggers electrical measurements by the electrical measurement device and geochemical measurements by the geochemical measurement device.

9. The system as claimed in claim 2, wherein the electrodes are placed on one of a surface of the ground, along walls of an underground cavity, and along a well.

10. The system as claimed in claim 1, wherein the means for transferring gas comprises a three-way solenoid valve, with a first way being connected to one of the gas sampling probes, a second way being connected to a purge system of the geochemical measurement device and a third way being connected to a pump for pumping gas sampled by the sampling probes and for distributing the gas to the geochemical measurement device.

11. The system as claimed in claim 10, wherein the gas analyzer comprises at least one detector of the stored gas and at least one detector of a rare gas.

12. The system as claimed in claim 11, wherein the resistivity meter transmits DC electrical current into the subsoil via two of the electrodes and records a difference in electrical potential between two other of the electrodes.

13. The system as claimed in claim 10, wherein the resistivity meter transmits DC electrical current into the subsoil via two of the electrodes and records a difference in electrical potential between two others of the electrodes.

14. The system as claimed in claim 10, wherein the controller regularly over time triggers electrical measurements by the electrical measurement device and geochemical measurements by the geochemical measurement device.

15. The system as claimed in claim 10, wherein the electrodes are placed on one of a surface of the ground, along walls of an underground cavity, and along a well.

16. The system as claimed in claim 1, wherein the gas analyzer comprises at least one detector of the stored gas and at least one detector of a rare gas.

17. The system as claimed in claim 16, wherein the resistivity meter transmits DC electrical current into the subsoil via two of the electrodes and records a difference in electrical potential between two other of the electrodes.

18. The system as claimed in claim 16, wherein the controller regularly over time triggers electrical measurements by the electrical measurement device and geochemical measurements by the geochemical measurement device.

19. The system as claimed in claim 16, wherein the electrodes are placed on one of a surface of the ground, along walls of an underground cavity, and along a well.

20. The system as claimed in claim 1, wherein the resistivity meter transmits a DC electrical current into the subsoil via two of the electrodes and records a difference in electrical potential between two others of the electrodes.

21. The system as claimed in claim 20, wherein the controller regularly over time triggers electrical measurements by the electrical measurement device and geochemical measurements by the geochemical measurement device.

22. The system as claimed in claim 20, wherein the electrodes are placed on one of a surface of the ground, along walls of an underground cavity, and along a well.

23. The system as claimed in claim 1, wherein the controller regularly over time triggers electrical measurements by the electrical measurement device and geochemical measurements by the geochemical measurement device.

24. The system as claimed in claim 23, wherein the electrodes are placed on one of a surface of the ground, along walls of an underground cavity, and along a well.

25. The system as claimed in claim 1, wherein the electrodes are placed on one of a surface of the ground, along walls of an underground cavity, and along a well.

26. The system as claimed in claim 1, wherein the weather station continuously checks at least one of temperature, pressure, rainfall and humidity.

27. The system as claimed in claim 1, wherein electrical power is supplied to the system by a solar panel connected to a battery.

28. The system as claimed in claim 1, wherein the means of transmitting the data is a modem.

29. A method of use of the system as claimed in claim 1 comprising monitoring with the system a geological gas storage site for storing $CO_2$ or methane.

30. The method as claimed in claim 29, comprising calibrating the system prior to injecting gas into the geological storage site for storing the injected gas.

* * * * *